P. A. JOHNSON.
TRACTOR.
APPLICATION FILED AUG. 9, 1916.

1,246,603.

Patented Nov. 13, 1917.
3 SHEETS—SHEET 1.

WITNESSES

INVENTOR
Peter A. Johnson
BY
ATTORNEYS

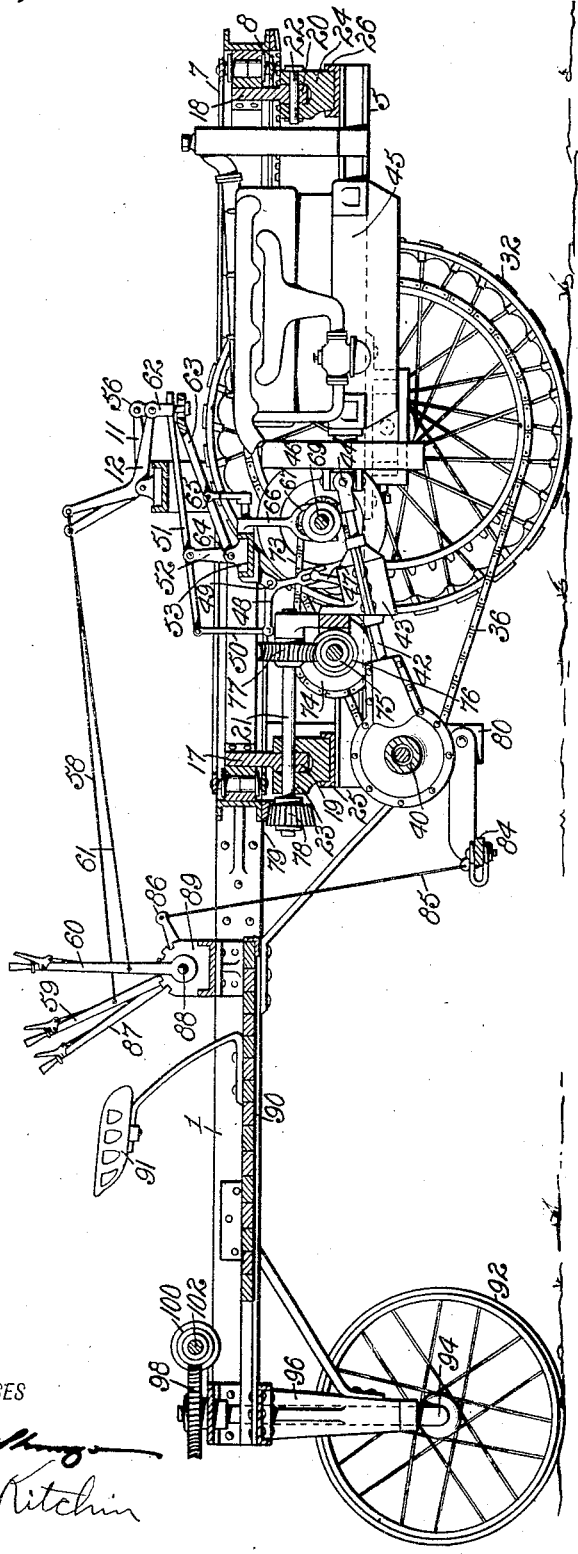

P. A. JOHNSON.
TRACTOR.
APPLICATION FILED AUG. 9, 1916.
1,246,603.
Patented Nov. 13, 1917.
3 SHEETS—SHEET 3.
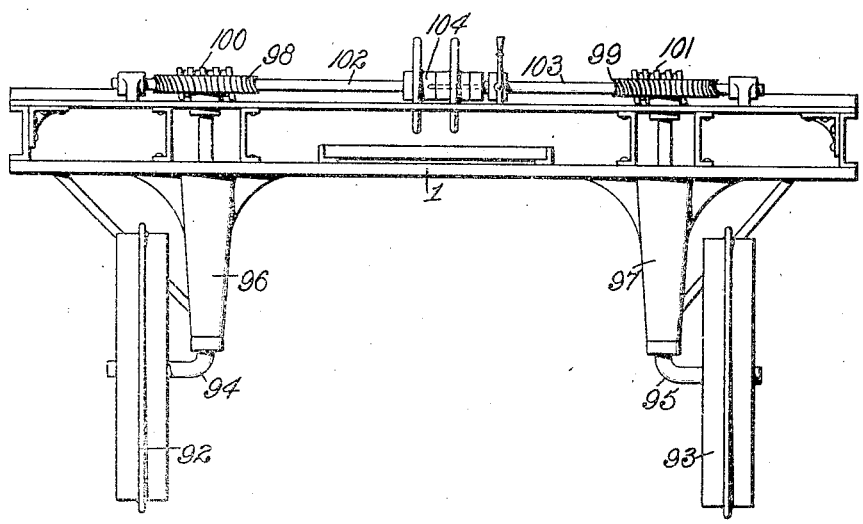
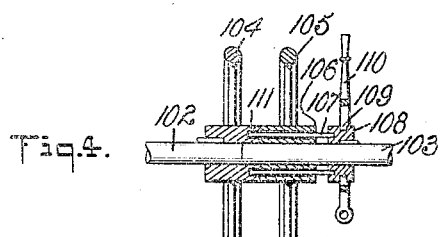
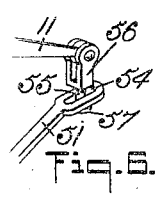
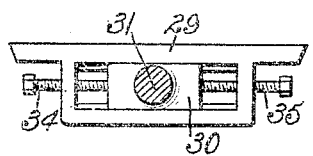
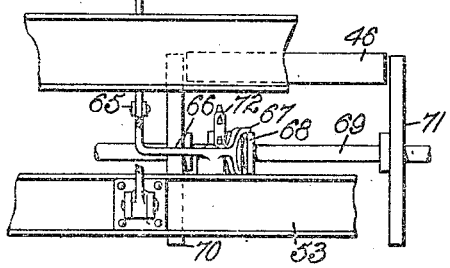
WITNESSES
INVENTOR
Peter A. Johnson
BY
ATTORNEYS

UNITED STATES PATENT OFFICE.

PETER ALBERT JOHNSON, OF STOUGHTON, WISCONSIN, ASSIGNOR OF ONE-THIRD TO RICHARD JOHNSON AND ONE-THIRD TO JOKUM JOHNSON, BOTH OF STOUGHTON, WISCONSIN.

TRACTOR.

1,246,603.  Specification of Letters Patent.  Patented Nov. 13, 1917.

Application filed August 9, 1916.   Serial No. 113,874.

*To all whom it may concern:*

Be it known that I, PETER A. JOHNSON, a citizen of the United States, and a resident of Stoughton, in the county of Dane and State of Wisconsin, have invented a new and Improved Tractor, of which the following is a full, clear, and exact description.

This invention relates to tractors and particularly to an improved arrangement for use on farms, and has for an object the provision of a structure which may be quickly and easily turned and which may be caused to travel in a certain direction without danger of side movement.

Another object in view is to provide a tractor in which the motor and other driving mechanism are arranged at the front, the structure being such that the entire driving mechanism may be rotated without affecting the position of the frame of the tractor.

A still further object in view is to provide a tractor with rear guiding wheels independently and collectively adjustable for preventing side movement or skidding.

In the accompanying drawings:

Fig. 2 is a sectional view through Fig. 1 on line 2—2.

Fig. 3 is a rear view of the rear part of the tractor shown in Fig. 1, disclosing an arrangement of the rear wheels and steering mechanism therefor.

Fig. 4 is a detail sectional view, on an enlarged scale, through Fig. 1 on line 4—4.

Fig. 5 is a detail horizontal sectional view showing the clutch and shaft, lever and associated parts, embodying certain features of the invention.

Fig. 6 is an enlarged detail fragmentary sectional view of one of the lifting members embodying certain features of the invention.

Fig. 7 is a detail fragmentary sectional view through Fig. 1 on line 7—7, showing the axle box and adjusting means therefor.

Figure 1:
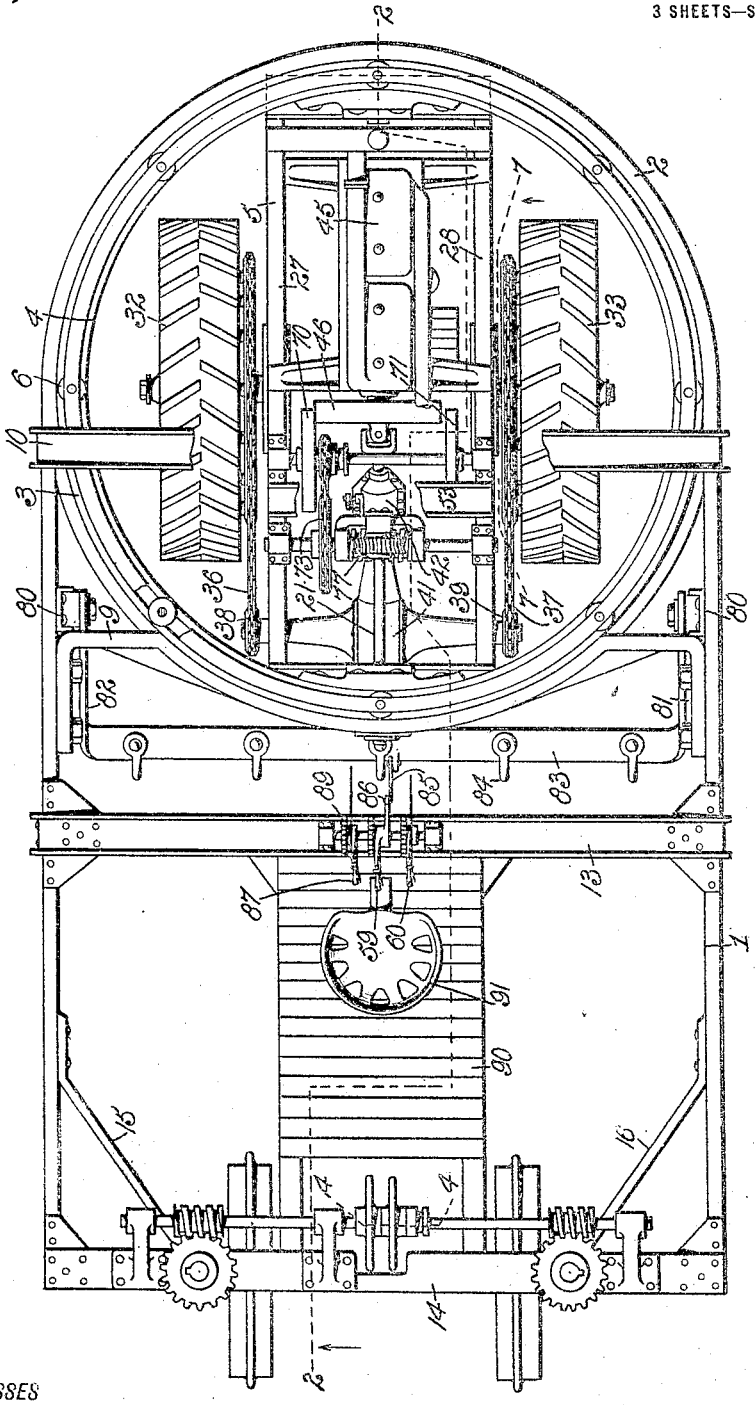
Figure 1 is a top plan view of a tractor disclosing an embodiment of the invention.

Referring to the accompanying drawings by numerals, 1 indicates a frame which is preferably rectangular at the rear but provided with a rounded front 2 which forms a half circle, and with a ring 3 which provides a circular guide or path for the ring 4, which last mentioned ring is rigidly connected with the motor frame 5 and held in proper position with respect to ring 3 by the guiding spools or rollers 6, (Fig. 1,) said spools or rollers being divided as shown in Fig. 2 and formed with upper and lower flanges. Retaining or spacing rings 7 and 8 are also provided for holding the spools or rollers in proper spaced position. A bracket 9 is bolted or otherwise secured to the sides of the frame 1 and supports the rear part of ring 3, as shown in Fig. 1, whereby the ring 4 and all parts connected therewith may freely rotate without affecting the frame 1. A transverse bracing bar or bridge member 10 is rigidly connected to the frame 1 at the point where the sides merge into the rounded section 2, said bridge acting as a cross brace and also as a support for the bell crank levers 11 and 12 hereinafter fully described. A second bracing and bridge member 13 is secured to the sides of the frame 1 which, with the rear end member 14, firmly holds the top of the frame in position, suitable braces 15 and 16 assisting in stiffening the various parts.

The ring 4 is connected to the frame 5 by means of brackets 17 and 18 (Fig. 2) riveted or otherwise rigidly secured to ring 4 and provided with depending ears 19 and 20, said ears having apertures therethrough so that ear 19 may accommodate shaft 21 and ear 20 accommodate the pin 22. Upstanding bifurcated brackets 23 and 24 are secured to cross bars 25 and 26 forming part of the frame 5, which frame is supplied with longitudinal bars 27 and 28. By the provision of the ears 17 and 18 and the pin 22, together with shaft 21, the frame may be tilted or oscillated without affecting the horizontal position of the frame 1 and associated parts and without causing any binding action between the various rings 3 and 4. The longitudinal bars 27 and 28 are bolted or otherwise rigidly secured to bearing boxes 29 (Fig. 7), which bearing boxes carry bearing blocks 30 through which the shaft 31 passes, said shaft being rigidly connected in any suitable manner with the traction wheels 32 and 33. Set screws 34 and 35 are fitted into the bearing boxes 29 and adjust the shaft 31 and parts associated therewith with respect to the frame 5, which results, among other things, in bringing the driving chains 36 and 37 under proper tension. It will be observed that the driving chains are passed over suitable sprockets which are rigidly connected with the wheels 32 and 33, and over sprockets 38 and 39 connected to shaft 40, which shaft is surrounded by a casing 41 containing suitable differential driving mechanism operated by the drive shaft 42, which drive shaft is connected through suitable clutch mechanism 43 and the universal connection 44 with the power shaft of engine 45, said power shaft carrying the fly wheel 46.

Whenever engine 45 is operating power will be transmitted as described to the power wheels 32 and 33 for moving the tractor provided the clutch in the casing 43 is closed, said clutch being of any desired or suitable construction operated by a lever 47 which in turn engages the forked end of a bell crank lever 48 pivotally mounted at 49 on the cross bar 53. A link 50 is pivotally connected with the bell crank lever 48 and with a lever 51, which lever is pivotally supported by a bracket 52 rigidly secured to the cross bar 53. The lever 51 extends to a position in line over the center of the ring 4 and is formed with a slot 54, as shown in Fig. 6, which accommodates the reduced end 55 of a bifurcated clip 56. The reduced end 55 merges into an enlarged end or head 57 for preventing lever 51 from being disconnected with the clip 56. Clip 56 is pivotally mounted on one of the arms of the bell crank lever 11, the opposite arm having a rod 58 connected thereto and to a hand operated lever 59 which, when moved in one direction, will operate the parts just described for throwing the clutch into operation, and when moved in the opposite direction will cause the clutch to be disconnected.

Arranged adjacent the lever 59 is a lever 60 having a rod or cable 61 connected therewith and with one of the arms of bell crank lever 12, the opposite arm having a clip 62 pivotally connected therewith, said last mentioned clip being identical with clip 56 but operating the lever 63, which lever is pivotally mounted at 64 and has connected therewith a lever 65, which lever is in turn pivotally connected with the clutch shifting lever 66, said clutch shifting lever being pivotally mounted on the cross bar 53 (Fig. 5) so that the bifurcated end 67 will engage the sleeve 68, which sleeve is connected with shaft 69, said shaft carrying friction wheels 70 and 71 adapted to be brought into frictional engagement with the fly wheel 46 so that shaft 69 may be driven in either direction according to the direction of movement of sleeve 68. Shaft 69 has a sprocket wheel 72 rigidly secured thereto, which sprocket wheel accommodates chain 73, said chain passing over a sprocket wheel 74 rigidly secured to shaft 75, which last mentioned shaft has a worm 76 connected therewith, said worm meshing with a worm gear 77. The worm gear 77 is rigidly secured to shaft 21 and shaft 21 carries a beveled pinion 78 meshing with rack 79 rigidly secured to the bracket 9 or to the rounded front 2, as shown more clearly in Fig. 2, whereby whenever the engine is running and either of the friction wheels 70 or 71 is in contact with the fly wheel 46, pinion 78 will be rotated and the engine, traction wheels and all parts connected therewith will be swung from one side to the other according to the direction of movement of these parts.

Connected with frame 1 are depending members 80 to which the ends 81 and 82 are pivotally connected, said ends being preferably formed integrally with the cross bar 83 acting as a draft member. Suitable clevises 84 are mounted on the draft bar 83 to which may be secured a harrow, plow, a train of wagons or, in fact, anything that is desired to be hauled or moved from place to place. In order that the draft bar 83 may be of the proper height a rod or cable 85 is connected therewith and with the end 86 of lever 87, lever 87 as well as levers 59 and 60 being pivotally mounted on a rod 88, which rod passes through suitable segmental racks 89 for receiving catches arranged on each of the levers just mentioned. By adjusting the position of the lever 87 the draft bar 84 may be raised or lowered as desired. By adjusting lever 59 power from engine 45 may be turned on or off as the same operates the clutch in casing 43, while operating lever 60 will cause the friction wheels 70 and 71 to be operated so as to connect the engine with beveled gear 78 for rotating frame 5 and parts carried thereby. The frame 1 is provided with a platform 90 on which a suitable seat 91 is arranged, the same being adjacent the levers 59, 60 and 87 so that the parts may be properly controlled.

At the rear of the frame 1 are arranged the rear wheels 92 and 93, said wheels being of identical construction and journaled on suitable journal rods 94 and 95, said rods being bent so as to form a right angle and caused to extend through guiding brackets 96 and 97, the rods 94 and 95 extending to a point above frame 1. Worm wheels 98 and 99 are rigidly secured to the rods or axles 94 and 95 at the upper end, said worm gears meshing with worms 100 and 101, which worms are rigidly secured to shafts 102 and 103 respectively. An operating wheel 104 is rigidly secured to shaft 102, as shown in Fig. 4, while an operating wheel 105 is loosely mounted on shaft 103, said last mentioned operating wheel having a plurality of apertures 106 arranged therein for accommodating the rods 107, which rods are rigidly secured to a spool 108 splined on the shaft 103. Spool 108 is provided with a groove 109 for receiving one or more pins arranged in lever 110 whereby when lever 110 is moved to the position shown in Fig. 4 the rods 107 are moved so that the ends will fit into the apertures 111 in the adjusting wheel 104, thus tying the wheels 104 and 105 together for causing the worms 100 and 101 to operate together. When the wheels 104 and 105 are connected up as shown in Fig. 4, the rear wheels may be moved at an angle or set at any position simultaneously, but when lever 110 is moved so as to cause the rods 101 to slide out of openings 111 the wheels 104 and 105 independently adjust the worms so that, if desired, only one wheel may be turned at an angle. The adjustment or shifting of the wheels 92 and 93 is desirable when plowing or operating on a field, as for instance, to cause the rear of the tractor to move over to its correct position and one of the wheels to follow any one of the furrows. Also, on side hills it is desirable to have both rear wheels at a slight angle in order to prevent side movement.

What I claim is:

1. A tractor of the character described, comprising a frame having a rounded front part, a bracket connected with said frame near the front formed arc-shaped and acting with the rounded front part to produce a ring structure, a complete stationary ring fitting into said ring structure, a rotatable ring arranged within the first mentioned ring but spaced therefrom, spools arranged between said rings, said spools having flanges for preventing the rings from getting out of alinement and for guiding the movable ring, an auxiliary frame, means for connecting the auxiliary frame with said rotatable ring, power wheels supporting said auxiliary frame and acting through said ring for supporting the front part of the first mentioned frame, an engine arranged on said auxiliary frame, means for connecting said engine with said power wheels, means for rotating said rotatable ring, said auxiliary frame and parts connected therewith independently of the first mentioned frame, and means for supporting the rear part of said first mentioned frame.

2. A tractor comprising a frame, means for supporting the rear part of the frame, a stationary ring connected with the front part of the frame, a horizontally rotatable ring arranged within said stationary ring and spaced therefrom, spools formed with flanges arranged between said rings and overlapping the rings for holding the rotatable ring in proper position, an auxiliary frame connected with said rotatable ring, supporting and driving wheels connected with said auxiliary frame, an engine connected with said driving wheels for rotating the same, a pinion and rack, means for connecting said engine with said pinion and rack, said rack being stationary and said pinion being mounted on said auxiliary frame whereby when the pinion is operated said auxiliary frame connected with said rotatable ring will be rotated in a horizontal plane, and controlling means for controlling the connection between said engine and said power wheels.

3. A tractor comprising a frame, a stationary ring arranged in the front part of the frame, a rotatable ring arranged within the first mentioned ring, means for holding the two rings in the same horizontal plane, a pair of depending members extending from opposite sides of said rotatable ring, an auxiliary frame, means for pivotally mounting said auxiliary frame on said depending members whereby the auxiliary frame may be tilted without moving said rotatable ring, power wheels for supporting said auxiliary frame, an engine arranged on said auxiliary frame, means for connecting the engine and the power wheels whereby the power wheels may be rotated, means operable by the engine for rotating the rotatable ring and parts connected therewith, and supporting means for the rear of the frame.

4. A tractor comprising a body, a circular structure arranged at the front of said body, a rotatable ring arranged within said circular structure, antifriction means for holding said ring in position, an annular rack connected to said circular structure, an auxiliary frame pivotally mounted on said ring, a pair of traction wheels for supporting said auxiliary frame, power means on said frame connected with the traction wheels for rotating said wheels, means for connecting said power means with said stationary rack, said means including a pinion whereby when said pinion is rotated the auxiliary frame and parts connected therewith will be turned in a horizontal plane, and means for turning on and off the power to and from said pinion.

5. A tractor comprising a frame, rear supporting means, a rotatable front ring, diametrically oppositely arranged ears projecting downwardly from said ring, an auxiliary frame, means for connecting said auxiliary frame with said ears whereby the frame may be tilted without tilting the ring or first mentioned frame, an engine arranged on said auxiliary frame, a pair of traction wheels supporting said auxiliary frame and through said auxiliary frame the front part of the first mentioned frame, a stationary annular ring fixed to said first mentioned frame, a pinion meshing with said rack, means for connecting said pinion with said engine, said means including a pair of friction disks and a power disk arranged there-between, means for pressing from the first mentioned disks against the power disk for causing said pinion to operate in either direction whereby said auxiliary frame and parts associated therewith may be rotated in a horizontal plane in either direction, and means for connecting said engine with said traction wheels for rotating the same.

6. A tractor comprising a frame, power means arranged adjacent the front of the frame for moving the frame, a pair of rear supporting wheels, means for adjusting said wheels independently so as to vary their angle of travel, and a connecting member for connecting said means whereby the traction means will operate simultaneously.

7. A tractor comprising a frame, power wheels arranged adjacent the front of the frame, means for driving said power wheels, a pair of supporting wheels, an axle for each of said wheels provided with a vertical extension, a worm wheel connected with each of said extensions, a pair of power shafts, a worm arranged on each of said power shafts meshing with said worm wheel, hand operated power members connected with said shafts for rotating the same independently, and means for connecting said hand operated power members so that they will rotate together.

PETER ALBERT JOHNSON.